United States Patent Office 2,989,557
Patented June 20, 1961

2,989,557
PROCESS FOR THE PRODUCTION OF
ALUMINUM AND ZINC ALKYLS
Sidney M. Blitzer, Roy L. Milde, and Tillmon H. Pearson, Baton Rouge, La., assignors to Ethyl Corporation, New York, N.Y., a corporation of Delaware
No Drawing. Filed Sept. 3, 1959, Ser. No. 837,766
7 Claims. (Cl. 260—429.9)

This invention relates to the synthesis of organometallic compounds. More specifically, the invention relates to a new method and process for generation of organometallic compositions, that is, compounds of a metal having at least one metal-carbon bond, by a new and improved reaction.

The organometallic compounds, as above defined, have long interested chemists as an illuminating field of study. In the course of many years of scientific exploration of methods of synthesis of this broad category of materials, a variety of generalized reactions have been proposed and are disclosed in the scientific literature and in the patent art. Preparative methods have been recently exhaustively reviewed by Jones and Gilman (Chemical Reviews, vol. 54, pp. 835–890, Oct. 1954).

Approximately two dozen generalized methods of preparation of organometallic compounds are known in the art. Review of these generalized methods, however, shows that a large fraction thereof are of interested solely from the scientific viewpoint because of certain economic or practical deficiencies. Thus, in the great majority of instances, a co-reactant involved in the synthesis reaction is a relatively expensive organic compound. Typical of such reactions are those involving ethers, ketones, organic halides, aryldiazonium compounds, etc. In other instances, although operability is well established, the generalized reaction method involves the utilization of rather unstable materials of a transitory existence character such as free radicals. As of the present date, the reactions exhibiting the most pronounced commercial potential have been the reactions of alloys of the desired metal of a metallo-organic compound with an organic halide. Typical of such are the preparation of mercury organics by reacting a sodium amalgam with an alkyl halide, or an alkyl sulfate. The organo compounds, such as alkyl compounds, of aluminum and zinc, have not been readily prepared by such a route. However, mercury alkyls can be, in turn, employed to produce compounds of aluminum by direct reaction with the metal or with an aluminum halide. Zinc alkyl compounds on the other hand, have been made more usually, by different, but equally involved or undesirable processes, such as the reaction of a Grignard reagent with zinc chloride. These methods, while perfectly operable, are primarily laboratory preparative techniques. Accordingly, a significant need has existed for a process for the production in a straightforward, economical manner, of the organocompounds of aluminum and zinc.

The present process is directed to providing a fundamentally new method of generation of the hydrocarbon compounds, of aluminum or zinc or more particularly, compounds or compositions containing organic radicals, the radical being attached to the metal by carbon and containing only carbon and hydrogen. A particular object is to provide a straightforward synthesis of such desired organo metal compounds without the necessity of employing a mercury reagent or similar heavy metal reagents which are themselves expensive and difficult to procure. Other objects will appear hereinafter.

The process of the present invention consists essentially of hydrogenation of an organo bimetal compound of a secondary metal, in the presence of free primary metals selected from the group consisting of aluminum and zinc. By secondary metal is meant an alkaline reacting metal of the alkali and alkaline earth groups, such as, for example, sodium, potassium, calcium, strontium and lithium. In all instances the secondary alkaline reacting metal employed is above the primary metal in the electromotive series of the elements. The secondary metal is employed in the form of a complex with the primary metal and is subjected to hydrogenation reaction conditions along with a further amount of free, subdivided primary metal and in the presence of a liquid reaction medium.

The process in all cases is performed at hydrogenating conditions, that is under sufficiently drastic conditions to apparently rupture a carbon-secondary metal bond and form a secondary metal hydrogen bonding. Generally, these conditions involve a moderately elevated temperature, and a substantial hydrogen applied pressure. Illustrative conditions are from about 50 to 150° C. and pressures of about 5 to 100 atmospheres of hydrogen partial pressure, although these are by no means exclusive ranges.

As previously stated, the suitable secondary metal, compounds of which are a component of any reaction system of the present invention, are more electropositive than the primary metal being converted. Illustrative pairs, of secondary-primary metals, are, then, lithium-zinc, lithium-aluminum, sodium-zinc, lithium-aluminum, potassium-zinc, sodium-aluminum, and potassium-aluminum. The secondary metal is employed, as previously mentioned, in the form of a bi-metal organometallic compound or complex, the second metal thereof being the primary metal.

The process is, as evident from the above, capable of a large number of embodiments and variations of the reactants, products and process conditions. These ramifications of the process will be discussed in greater amplitude hereafter and the scope of their range will be illustrated by the working examples given hereafter.

The organometallic compositions derived by the reactions of the invention have a substantial number of uses. Thus these products, in instances wherein the multivalent primary metal is converted by the process to an organometallic hydride, can be subsequently treated with a terminally unsaturated hydrocarbon compound to provide a compound having all valences satisfied by carbon-metal bonds. These materials also are desirable for certain high energy fuel application, as igniters and as intermediates or polymerization catalysts in many cases. The products are useful both as separated purified compounds or in slurry or solution form.

The details of the process and the variations thereof will be understood more readily from the following detailed examples.

*Example 1*

A round bottom autoclave is charged with approximately 10 parts by weight of finely divided aluminum metal, produced, for example by milling under specially dried argon or nitrogen, this charging being concurrently with approximately 50 parts by weight of dry kerosene, free of unsaturates, as a reaction medium. To this is added approximately 40 parts by weight of diethyl sodium aluminum dihydride. A hydrogen pressure of the order of 1,000 pounds per square inch is applied, and the contents are steadily agitated while the temperature is raised from ambient levels to about 100° C. The contacting is continued, with maintenance of hydrogen pressure and temperature, for a period of approximately 4 hours. At this time, the temperature applied to the autoclave is reduced to ambient temperatures of the order of about 30° C. or below, and after reduction of temperature, the hydrogen pressure is gradually released. A good conversion of the aluminum metal is obtained, the products including diethyl aluminum hydride and ethyl sodium aluminum trihydride.

The sodium-aluminum organometallic complexes, as illustrated by the foregoing example, are among the most favored reactants providing the secondary metal of the process. However, numerous other bi-metal compounds can be employed. These bimetallic organometallic compounds include, for example, tetraethyl sodium aluminum, tetraethyl potassium aluminum, triethyl magnesium aluminum dihydride, diethyl sodium aluminum dihydride, triethyl sodium aluminum hydride, ethyl sodium zinc dihydride, tetraoctyl sodium aluminum, tetracyclohexyl sodium aluminum and the like. Those in which one metal is a group I-A metal, especially sodium, and the other metal is aluminum and the organo portion is alkyl, comprise particularly preferred bimetallic organometallic compounds.

Owing to the plurality of valences available in the bimetal complexes of the secondary metal, said complex may have variable numbers of alkyl groups per mole, as in the following example.

Example II

Substituting sodium aluminum triethyl hydride in the above example and employing a hydrogen pressure of 500 p.s.i.g., there is coproduced sodium aluminum diethyl dihydride along with diethyl aluminum hydride.

An additional illustration of the process, wherein the maximum number of alkyl groups are provided, is shown by the following example.

Example III

A charge comprising approximately 350 parts of tetraethyl sodium aluminum and about 30 parts of subdivided aluminum, are charged, and processed generally as in Example I. A high conversion of the aluminum to diethyl aluminum hydride is obtained. Better results are obtained if the quantity of aluminum is further increased, to, usually about one or more moles per mole of the complex of the secondary metal, which is 100 percent excess, on the basis of supplying one alkyl group to the aluminum from each mole of complex. When large excesses of aluminum are thus advantageously used, a solvent, or extraneous liquid reaction medium is very advantageously used.

When potassium is used as the secondary metal, in the form of tetraethyl potassium aluminum, comparable results are achieved.

The following example illustrates the application of the process to the processing of zinc as the primary metal.

Example IV

The procedure of Example I is repeated, except that in this instance, the charge is about 270 parts of tetraethyl sodium dizinc hydride $(C_2H_5)_4NaZn_2H$, and about 250 parts of finely ground, clean zinc powder. About 500 parts of a solvent comprising the dimethyl ether of diethylene glycol is provided. A good yield of a solution containing ethyl zinc hydride is provided, which can be separated from the excess zinc by known methods.

Example V

The procedure of Examples I, II, or III are repeated, except that, instead of employing the named ethyl compounds of the secondary metal, complexes containing different alkyl groups are substituted. Thus, the operations are carried out with tri-(isobutyl) sodium aluminum hydride, triethyl-methyl sodium-aluminum, tri-methyl sodium aluminum hydride, tri-(2-methyl-butyl) sodium aluminum hydride, and tri-(2-ethyl octyl) sodium aluminum hydride, and similar results are achieved.

Example VI

Similar operations are readily feasible when the alkaline earth metals are the secondary metals. Thus when the secondary metal compounds of the foregoing examples are the corresponding bimetal compounds of calcium, magnesium, strontium or barium, similar results are achieved.

The distribution of reaction products is contingent upon a number of factors, among the most important thereof being the proportions of reactants employed and, of course, the composition of the initial bimetal compound of the secondary metal. When it is desired, for example, to convert the primary metal to a fully reacted organometallic, that is, with all the valences of the metal satisfied by carbon metal bonds, it will be found desirable to employ a substantial excess of the organometallic of the secondary metal component as a starting reagent. In such instances, the customary reaction progress will result in the release of the secondary metal as a partial hydride compound with the remainder of the valences still sustaining or attaching organic radicals to the secondary metals. On the other hand, when the reaction is desired to convert the primary metal to an organometallic hydride compound, it will normally be found desirable or expedient to employ the organometallic compound of the secondary metal in somewhat reduced proportions at or slightly below the stoichiometric quantity required to produce the desired compounds. By excess or deficiency is meant the relative proportions usually at the start and during the bulk of the reaction. Even when excess proportion of the secondary metal compound is employed it is normally most practical to not attempt to achieve complete conversion of the primary metal in any single batch operation. Rather, it is much more efficient, particularly with respect to the attainable production rate, to react only a part of the primary metal, than to separate the products and retain the unreacted aluminum for a succeeding operation.

As already described the temperatures and pressures of reaction are subject to great variation according to the properties and proportions of the components of the reacting system. By and large, the pressures necessary are readily ascertainable and will be found to be in the range of about 5 atmospheres to about 1,000 atmospheres hydrogen pressure and at temperatures of 50° to about 200° C., although these temperatures are not explicitly limiting. Preferred ranges of pressure and temperature are respectively, in most cases, from 5 to 200 atmospheres and from 50 to about 150° C.

The examples herein are generally of the batch-type of operation which is quite suitable inasmuch as all forms of the process involve the presence of a solid metal charge, the reacting system being a heterogeneous system. Batch operations are normally more convenient, but the process is not necessarily explicitly confined to any form of reaction technique. If continuous processing is desired, means are readily devisable for the appropriate circumstances.

The reaction mechanism of the process is not fully understood and applicants are not desirous of being bound to any particular explanation. However, it is believed that in the course of reaction the hydrogen reacts with the organometallic compound of the secondary metal initially, releasing a free organometallic radical which because of the copresence of particles of the primary metal, readily react therewith before the radials degrade to stable and unreactive compounds.

The process does not necessarily rely upon catalysts for efficacy, but the addition of catalysts is contemplated as desirable under some certain circumstances. As examples of suitable catalysts may be mentioned such compounds as the higher halides of the primary metal involved. Thus, metals as the secondary metals, the chlorides, bromides, iodides in catalytic quantities will be frequently effective. Also contemplated as catalysts are the so-called sesquihalides of the tertiary metals. Illustrative of such materials are aluminum sesquichloride, $(C_2H_5)_3Al_2Cl_3$, and analogous compounds of the bi-valent metals.

Although the preceding examples generally involved the use of reaction media, such media are not absolute essentials to the operation and in fact in many instances are undesirable and/or unnecessary. Thus, when either the compound of the secondary metal initially present, or the organometallic compound of the primary metal formed in the process are liquid and relatively stable under the conditions of operation, a reaction medium is frequently undesirable because it tends to dilute the reactants and minimize the effectiveness of contact of the hydrogen atmosphere and the other components of the reaction system. The reaction media when desired can be selected from a wide variety of liquid materials, of which the alkane petroleum solvent fractions are usually considered most suitable. The ethers are frequently employed although their use is sometimes avoided, because of the known tendency of forming complexes with the simple ethers. Illustrative of other reaction media suitable are ethers of polyhydroxy compounds (although these again are preferably not employed with aluminum compounds) such as the glycol ethers, or tri-hydroxy ether compounds such as glycerine.

The physical characteristics of the primary metal charged are not of great criticality. It is found generally that the rapidity of reaction is more or less proportional to the degree of subdivision which is related to the metal surface presented of the primary metal charged. Thus although highly effective results are provided when using coarse granules of the metal, it is preferable that the metals be as flakes or ground particles passing generally through a 50 mesh screen and preferably retained on a 150 mesh screen. This difference in particle size will be responsible for a substantial reduction in reaction time. Similarly, an excess of the primary metal aids in the rate of production.

Although the examples and description given above are primarily directed to the manufacture of organometallics of the primary metal wherein the organo substituent radicals, if plural, are identical, also contemplated is the introduction of a diversity of radicals on the same primary metals. This can be accomplished by employing a plurality of different secondary metal compounds, or by providing the bimetal-secondary metal compound having more than one alkyl substituent thereon. For example, methyl triethyl sodium aluminum, as used in Example V, can be a source for providing both methyl and ethyl substituents on a primary metal.

The organo groups, of the second metal-bimetal starting materials, preferably are the lower alkyl groups, that is, containing up to above five carbon atoms. Organo groups of up to about eight or ten carbon atoms are readily treated by the process. With the increase in chain length of the organo groups, the reaction conditions must be more carefully controlled to prevent undesired pyrolysis and degradation.

This application is a continuation-in-part of our application Serial No. 737,515, filed May 26, 1958, now abandoned, which application was a continuation-in-part of our application Serial No. 513,627, filed June 7, 1955, now abandoned.

Having fully described the process of this invention, what is intended to be claimed is:

1. The process of manufacturing an alkyl compound of a primary metal selected from the group consisting of aluminum and zinc, said compound having at least one alkyl radical and consisting of carbon, hydrogen and the primary metal, the carbon in said compound being alkyl radical carbon, said process comprising hydrogenating an alkyl bimetal compound of a secondary metal and the primary metal, and in the presence of the primary metal, said secondary metal being selected from the group consisting of alkali and alkaline earth metals, said alkyl bimetal compound having at least one alkyl radical and consisting of the secondary metal, the primary metal, carbon and hydrogen, and the carbon of said alkyl bimetal compound being alkyl radical carbon.

2. The process comprising hydrogenating triethyl sodium aluminum hydride in the presence of aluminum metal at a pressure between about 5 to 200 atmospheres and a temperature between 50 and 150° C.

3. The process comprising hydrogenating diethyl sodium aluminum dihydride in the presence of aluminum metal at a pressure between about 5 to 200 atmospheres and a temperature between 50 to 150° C.

4. The process comprising hydrogenating tetraethyl sodium dizinc hydride in the presence of zinc metal at a pressure between about 5 to 200 atmospheres and a temperature between 50 and 150° C.

5. The process comprising hydrogenating tri-isobutyl sodium aluminum hydride in the presence of aluminum metal at a pressure between about 5 to 200 atmospheres and a temperature between 50 and 150° C.

6. The process comprising hydrogenating trimethyl sodium aluminum hydride in the presence of aluminum metal at a pressure between about 5 to 200 atmospheres and a temperature between 50 and 150° C.

7. The process comprising hydrogenating tetraethyl sodium aluminum in the presence of aluminum metal at a pressure between about 5 to 200 atmospheres and a temperature between 50 to 150° C.

References Cited in the file of this patent

Goddard et al.: "Text of Inorganic Chem." XI, page 26, (1928).
Zortman et al.: J.A.C.S. 54, 3398 (1932).
Schumb et al.: J.A.C.S. 60, 306–8 (1938).
Gilman et al.: J.A.C.S. 60, 2336 (1938).
Loubengayer et al.: J.A.C.S. 63, 477–8 (1941).
Sedgewick: "Chem. Elements and their Compounds," vol. I, page 69 (1950).